(12) United States Patent　　　　(10) Patent No.:　US 12,646,377 B2

González et al.　　　　　　　　　　(45) Date of Patent:　　Jun. 2, 2026

(54) SYSTEM AND METHOD FOR INCREASING USER ENGAGEMENT WITH ONLINE SPORTS BETTING

(71) Applicant: KenTech S.L.U., Las Palmas (ES)

(72) Inventors: David González González, Las Palmas (ES); Ivaylo Bozoukov, Katy, TX (US); Petko Iliev, Burgas (BG)

(73) Assignee: KenTech S.L.U., Las Palmas (ES)

( * ) Notice: Subject to any disclaimer, the term of this patent is extended or adjusted under 35 U.S.C. 154(b) by 418 days.

(21) Appl. No.: 18/170,861

(22) Filed: Feb. 17, 2023

(65) Prior Publication Data

US 2023/0290223 A1　　Sep. 14, 2023

Related U.S. Application Data

(60) Provisional application No. 63/268,988, filed on Mar. 8, 2022.

(51) Int. Cl.
*G07F 17/32*　　　(2006.01)
*G06Q 40/12*　　　(2023.01)
*G06Q 50/34*　　　(2012.01)

(52) U.S. Cl.
CPC ....... *G07F 17/3267* (2013.01); *G06Q 40/123* (2013.12); *G06Q 50/34* (2013.01); *G07F 17/3213* (2013.01); *G07F 17/3223* (2013.01); *G07F 17/323* (2013.01); *G07F 17/3288* (2013.01)

(58) Field of Classification Search
CPC ... G07F 17/32; G07F 17/3288; G07F 17/3225
See application file for complete search history.

(56) References Cited

U.S. PATENT DOCUMENTS

| | | | | |
|---|---|---|---|---|
| 5,830,068 A | * | 11/1998 | Brenner | .............. G07F 17/3288 463/42 |
| 6,120,376 A | * | 9/2000 | Cherry | .................... G07F 17/32 463/16 |
| 6,152,822 A | * | 11/2000 | Herbert | ................... G07F 17/32 463/16 |

(Continued)

FOREIGN PATENT DOCUMENTS

WO　　WO 2023/172813　　　9/2023

*Primary Examiner* — Chase E Leichliter
(74) *Attorney, Agent, or Firm* — Levine Bagade Han LLP

(57) ABSTRACT

Disclosed are systems and methods for increasing user engagement with online sports betting. In one embodiment, a method comprises receiving, at a server, a request from a client device to place a bet of a certain bet amount on a sporting event having odds associated with the sporting event. The method can also comprise calculating a plurality of probability ranges, wherein each of the plurality of probability ranges is associated with a multiplier or a non-multiplier, and generating a random number using a pseudo random number generator. The method can also comprise selecting the multiplier associated with a particular probability range when the random number generated falls within the particular probability range. The method can further comprise calculating a boosted possible payout amount using the bet amount, the odds, and the multiplier and revealing the boosted possible payout amount and the multiplier via a slot machine graphic.

20 Claims, 8 Drawing Sheets

(56) References Cited

U.S. PATENT DOCUMENTS

| | | | | |
|---|---|---|---|---|
| 6,309,307 B1 * | 10/2001 | Krause | A63F 1/00 | 463/16 |
| 6,331,148 B1 * | 12/2001 | Krause | A63F 1/00 | 463/16 |
| 6,358,150 B1 * | 3/2002 | Mir | G07F 17/3288 | 463/43 |
| 6,450,887 B1 * | 9/2002 | Mir | G07F 17/3288 | 463/43 |
| 7,883,411 B2 * | 2/2011 | Vlazny | G07F 17/32 | 463/28 |
| 8,636,571 B2 * | 1/2014 | Miller | G06Q 50/34 | 463/28 |
| 9,947,174 B2 * | 4/2018 | Rangarajan | G07F 17/3244 | |
| 10,997,825 B2 * | 5/2021 | Neely | G07F 17/3244 | |
| 11,189,133 B2 * | 11/2021 | Neely | C07D 495/14 | |
| 11,189,134 B2 * | 11/2021 | Neely | C07D 495/14 | |
| 11,195,379 B1 | 12/2021 | Huke et al. | | |
| 11,514,759 B2 * | 11/2022 | Neely | G07F 17/3225 | |
| 2004/0193469 A1 * | 9/2004 | Amaitis | G07F 17/3244 | 705/500 |
| 2004/0229671 A1 * | 11/2004 | Stronach | G07F 17/3288 | 463/6 |
| 2005/0170886 A1 * | 8/2005 | Miller | G07F 17/3288 | 463/28 |
| 2005/0176499 A1 * | 8/2005 | Stronach | G07F 17/32 | 463/27 |
| 2006/0084483 A1 * | 4/2006 | Shin | G07F 17/3288 | 463/16 |
| 2006/0246990 A1 * | 11/2006 | Downes | G07F 17/3223 | 463/16 |
| 2006/0258432 A1 * | 11/2006 | Packer | G07F 17/3288 | 463/16 |
| 2007/0026940 A1 * | 2/2007 | Cannella | G07F 17/3288 | 463/16 |
| 2007/0155471 A1 * | 7/2007 | Powell | G07F 17/3286 | 463/19 |
| 2008/0248846 A1 * | 10/2008 | Stronach | G07F 17/3288 | 463/6 |
| 2009/0011813 A1 * | 1/2009 | Saffron | G07F 17/3288 | 463/17 |
| 2010/0120538 A1 * | 5/2010 | DeWitt | G07F 17/3223 | 463/29 |
| 2010/0210351 A1 * | 8/2010 | Berman | G07F 17/3246 | 463/25 |
| 2011/0053684 A1 * | 3/2011 | Attwood | G07F 17/3288 | 463/28 |
| 2011/0223989 A1 * | 9/2011 | Owen | G07F 17/3276 | 463/25 |
| 2012/0034961 A1 * | 2/2012 | Berman | G07F 17/3288 | 463/6 |
| 2012/0071223 A1 | 3/2012 | Sharkov et al. | | |
| 2013/0053991 A1 * | 2/2013 | Ferraro, III | G06Q 90/00 | 700/93 |
| 2014/0011573 A1 * | 1/2014 | Amaitis | G07F 17/3274 | 463/25 |
| 2014/0066188 A1 * | 3/2014 | Brooks | G07F 17/3225 | 463/28 |
| 2014/0066189 A1 * | 3/2014 | Brooks | G07F 17/326 | 463/28 |
| 2015/0262452 A1 * | 9/2015 | Corckran | G07F 17/3295 | 463/28 |
| 2015/0302698 A1 * | 10/2015 | Keech | G07F 17/3288 | 463/16 |
| 2015/0364009 A1 * | 12/2015 | Keech | G07F 17/3225 | 463/28 |
| 2016/0098900 A1 | 4/2016 | Benrus | | |
| 2016/0189483 A1 * | 6/2016 | Ballman | G07F 17/3258 | 463/28 |
| 2017/0046905 A1 | 2/2017 | Ramos et al. | | |
| 2017/0372561 A1 * | 12/2017 | Aronson | G07F 17/3272 | |
| 2019/0251789 A1 * | 8/2019 | Waters | G07F 17/3288 | |
| 2019/0325707 A1 * | 10/2019 | Aronson | G07F 17/3246 | |
| 2020/0327777 A1 | 10/2020 | Higgins et al. | | |
| 2021/0074126 A1 | 3/2021 | Nelson et al. | | |
| 2021/0241582 A1 * | 8/2021 | Neely | C07D 401/14 | |
| 2023/0019741 A1 * | 1/2023 | Neely | C07D 211/88 | |
| 2023/0290223 A1 * | 9/2023 | González | G07F 17/3288 | |

* cited by examiner

| Details | | |
|---|---|---|
| TOTAL ODDS | 4.37 | ~114 |
| AMOUNT | EUR 100.00 | ~116 |
| EXCISE TAX | EUR 6.97 | ~402 |
| STAKE | EUR 93.03 | ~404 |
| POSSIBLE WIN | EUR 406.54 | ~206 |
| NET POSSIBLE WIN | EUR 313.51 | ~406 |
| BOOST (3X MULTIPLIER) | X3 | ~310, ~302 |
| NET BOOSTED WIN | EUR 940.53 | ~408 |
| 20% WITHHOLDING TAX | EUR 188.11 | ~410 |
| POSSIBLE PAYOUT | EUR 845.45 | ~304 |
| CLOSE | | |

400

400

| Details | |
|---|---|
| TOTAL ODDS | 4.37 — 114 |
| BET AMOUNT | EUR 100.00 — 116 |
| STAKE | EUR 100.00 |
| POSSIBLE WIN | EUR 437.00 — 206 |
| NET POSSIBLE WIN | EUR 337.00 — 418 |
| BOOST (MULTIPLIER) | X3 — 310 / 302 |
| NET BOOSTED WIN | EUR 1011.00 — 420 |
| POSSIBLE PAYOUT | EUR 1111.00 — 304 |
| | CLOSE |

400

| Details | |
|---|---|
| TOTAL ODDS | 4.37 — 114 |
| BET AMOUNT | EUR 100.00 — 116 |
| STAKE | EUR 100.00 |
| POSSIBLE WIN | EUR 437.00 — 206 |
| NET POSSIBLE WIN | EUR 337.00 — 412 |
| BOOST (3X MULTIPLIER) | X3 — 310 / 302 |
| NET BOOSTED WIN | EUR 1011.00 — 414 |
| 20% WITHHOLD. TAX | EUR 202.20 — 416 |
| POSSIBLE PAYOUT | EUR 908.80 — 304 |
| | CLOSE |

126

500    504

| | | ACCUMULATED BONUS PAYMENT | ACCUMULATED COMPANY PROFIT | K(daily) |
|---|---|---|---|---|
| 01 | Tuesday February | -- | 372 EUR | -- |
| 02 | Wednesday February | 558 EUR | 39,169 EUR | 0.01425 |
| 03 | Thursday February | 13,750 EUR | 81,712 EUR | 0.16827 |

Bet Spinner Tools ⌄

122

502

600

| Multiplier | Multiplier Coefficient | Original Multiplier Probability | New Multiplier Probability |
|---|---|---|---|
| 100X | 0.10 | 0.0000015 | 0.00000015 |
| 50X | 1.00 | 0.0000030 | 0.0000030 |
| 10X | 1.00 | 0.0000149 | 0.0000149 |
| 5X | 1.00 | 0.0000298 | 0.0000298 |
| 3X | 1.00 | 0.0000496 | 0.0000496 |
| 2X | 1.00 | 0.0000744 | 0.0000744 |

FIG. 6

SYSTEM AND METHOD FOR INCREASING USER ENGAGEMENT WITH ONLINE SPORTS BETTING

CROSS-REFERENCE TO RELATED APPLICATION

This application claims the benefit of U.S. Provisional Application No. 63/268,988 filed on Mar. 8, 2022, the content of which is incorporated herein by reference in its entirety.

TECHNICAL FIELD

This disclosure relates generally to the field of online sports betting and to, among other things, systems and methods for increasing user engagement with online sports betting.

BACKGROUND

The ubiquity of smartphones, tablets, and laptops has made online sports betting as convenient as other online activities such as online shopping and online gaming. Sports enthusiasts in jurisdictions that allow for online sports betting can now simply place a bet on an upcoming or live sporting event with a few taps on the touchscreens of their smartphones. However, as interest in online sports betting grows, one challenge faced by online sports betting platforms is how to keep users engaged and entertained such that these users continue to place bets and, more importantly, continue to place bets with the same platform.

While online sports betting platforms have offered users free betting credits or physical prizes for placing bets, such incentives often do not translate to increased user engagement. Moreover, any incentivization structure should be fair for all users and not be vulnerable to exploitation by nefarious individuals. Furthermore, such incentivization structures should also be well-controlled such that the financial health of the online sports betting platform is not put at risk as a result of unforeseen betting outcomes.

Therefore, a solution is needed that increases user engagement with an online sports betting platform while also addressing the aforementioned concerns. Such a solution should be fair to all users but also secure and not easily subject to exploitation. Moreover, such a solution should not only draw in new users but also maintain the interest of existing users. Furthermore, such a solution should be entertaining without putting the financial health of the platform at risk.

SUMMARY

Disclosed herein are systems and methods for increasing user engagement with online sports betting. In some embodiments, a method for increasing user engagement with sports betting can comprise receiving, at a server, a request from a client device to place a bet on at least one sporting event having odds associated with the sporting event, wherein the request can comprise a bet amount; calculating a plurality of probability ranges, wherein each of the plurality of probability ranges can be associated with a multiplier from a selection of multipliers or a non-multiplier; generating, at the server, a random number using a pseudo random number generator, wherein the random number can be a number that falls within one of the plurality of probability ranges; selecting the multiplier associated with a particular probability range when the random number generated by the pseudo random number generator falls within the particular probability range; calculating, at the server, a boosted possible payout amount based in part on the bet amount, the odds, and the multiplier; and transmitting instructions to the client device to reveal the boosted possible payout amount and the multiplier via a slot machine graphic rendered on a display of the client device after the bet is placed, and wherein winning the bet associated with the sporting event results in a user of the client device winning the boosted possible payout amount.

In some embodiments, a system for increasing user engagement with sports betting is disclosed. The system can comprise a server communicatively coupled to a plurality of client devices, wherein the server can comprise one or more server processors programmed to: receive a request from one of the client devices to place a bet on at least one sporting event having odds associated with the sporting event, wherein the request can comprise a bet amount; calculate a plurality of probability ranges, wherein each of the plurality of probability ranges is associated with a multiplier from a selection of multipliers or a non-multiplier; generate a random number using a pseudo random number generator, wherein the random number is a number that falls within one of the plurality of probability ranges; select the multiplier associated with a particular probability range when the random number generated by the pseudo random number generator falls within the particular probability range; calculate a boosted possible payout amount based in part on the bet amount, the odds, and the multiplier; and transmit instructions to the client device to reveal the boosted possible payout amount and the multiplier via a slot machine graphic rendered on a display of the client device after the bet is placed, and wherein winning the bet associated with the sporting event results in a user of the client device winning the boosted possible payout amount.

In some embodiments, a non-transitory computer-readable medium is disclosed comprising machine-executable instructions stored thereon, that when executed by one or more processors, perform steps comprising: receiving a request from a client device to place a bet on at least one sporting event having odds associated with the sporting event, wherein the request can comprise a bet amount; calculating a plurality of probability ranges, wherein each of the plurality of probability ranges is associated with a multiplier from a selection of multipliers or a non-multiplier; generating a random number using a pseudo random number generator, wherein the random number is a number that falls within one of the plurality of probability ranges; selecting the multiplier associated with a particular probability range when the random number generated by the pseudo random number generator falls within the particular probability range; calculating a boosted possible payout amount based in part on the bet amount, the odds, and the multiplier; and transmitting instructions to the client device to reveal the boosted possible payout amount and the multiplier via a slot machine graphic rendered on a display of the client device after the bet is placed, and wherein winning the bet associated with the sporting event results in a user of the client device winning the boosted possible payout amount.

In some embodiments, the boosted possible payout amount can be calculated by: calculating, at the server, a possible winning amount based in part on the bet amount and the odds associated with the sporting event; subtracting the bet amount from the possible winning amount to obtain a net possible winning amount; multiplying a multiplier value of the multiplier by the net possible winning amount to obtain a net possible boosted winning amount; and adding the net possible boosted winning amount to the bet amount to obtain the boosted possible payout amount.

In some embodiments, the boosted possible payout amount can be calculated by: calculating, at the server, an excise tax amount based on the bet amount and an excise tax rate; subtracting the excise tax amount from the bet amount to yield a post-tax bet amount; calculating a possible winning amount based in part on the post-tax bet amount and the odds associated with the sporting event; subtracting the post-tax bet amount from the possible winning amount to obtain a net possible winning amount; multiplying a multiplier value of the multiplier by the net possible winning amount to obtain a net possible boosted taxable winning amount; calculating a withholding tax amount by multiplying a withholding tax rate by the net possible boosted taxable winning amount; and adding the net possible boosted taxable winning amount to the post-tax bet amount and then subtracting the withholding tax amount to obtain the boosted possible payout amount.

In some embodiments, the boosted possible payout amount can be calculated by: calculating, at the server, a possible winning amount based in part on the bet amount and the odds associated with the sporting event; subtracting the bet amount from the possible winning amount to obtain a net possible winning amount; multiplying a multiplier value of the multiplier by the net possible winning amount to obtain a net possible boosted taxable winning amount; calculating a withholding tax amount by multiplying a withholding tax rate by the net possible boosted taxable winning amount; and adding the net possible boosted taxable winning amount to the bet amount and then subtracting the withholding tax amount to obtain the boosted possible payout amount.

In some embodiments, the slot machine graphic can comprise a plurality of reels. Each of the reels can comprise at least one symbol associated with the multiplier. The multiplier can be revealed by graphically rotating all of the reels and successively stopping each of the reels on the symbol associated with the multiplier.

In some embodiments, the selection of multipliers can comprise a 2× multiplier having a multiplier value of 2, a 3× multiplier having a multiplier value of 3, a 5× multiplier having a multiplier value of 5, a 10× multiplier having a multiplier value of 10, a 50× multiplier having a multiplier value of 50, or a 100× multiplier having a multiplier value of 100.

In some embodiments, the plurality of probability ranges can be calculated by: calculating a multiplier probability ($p_{multiplier}$) associated with each of the multipliers from the selection of multipliers; and using a cumulative distribution function to establish boundary values for each of the probability ranges. At least some of the boundary values can be calculated using one or more multiplier probabilities. The plurality of probability ranges can be non-overlapping numerical ranges.

In some embodiments, the multiplier probability ($p_{multiplier}$) can be calculated using the following expression:

$$p_{multiplier} = \left(\frac{\text{daily coefficient}}{\text{Multiplier value}}\right) \times \text{margin}$$

The margin can be calculated based on the odds of the sporting event and the daily coefficient can be a ratio calculated at least once per day.

In some embodiments, the server can store the daily coefficient as part of a local configuration on the server. The server can update the local configuration by querying a network database periodically.

In some embodiments, the server can receive a request from the client device to place a bet on multiple sporting events comprising a first sporting event having a first odds associated with the first sporting event and a second sporting event having a second odds associated with the second sporting event The server can calculate a combined odds based in part on the first odds and the second odds and calculate the possible winning amount based on the bet amount and the combined odds.

BRIEF DESCRIPTION OF THE DRAWINGS

FIG. 6 is a table illustrating a multiplier coefficient applied to a multiplier probability.

DETAILED DESCRIPTION

Figure 1:
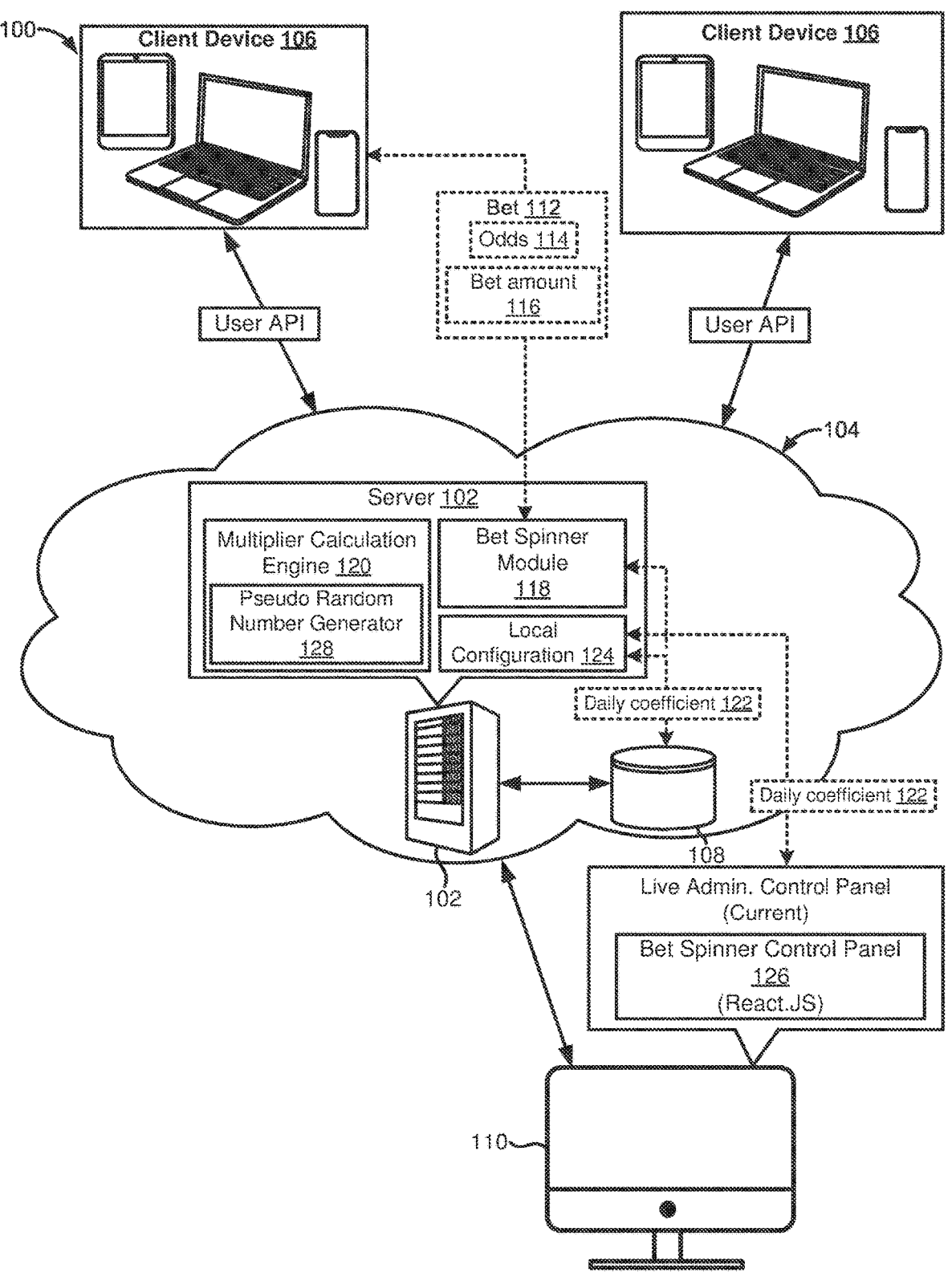
FIG. 1 illustrates one embodiment of a system for increasing user engagement with online sports betting.

FIG. 1 illustrates one embodiment of a system 100 for increasing user engagement with online sports betting. In some embodiments, the system 100 can refer to certain modules or engines of an online sports betting platform. For example, the system 100 can comprise certain modules and engines of a server 102 of the online sports betting platform.

A plurality of client devices 106 can communicate or connect with the server 102 in order to place bets with the online sports betting platform and receive payouts from the online sports betting platform. As will be discussed in more detail in later sections, the server 102 can receive a request from one of the client devices 106 to place a bet on at least one sporting event 202 (see, e.g., FIG. 2A). The system 100 can increase user engagement with the online sports betting platform by enhancing or boosting a possible payout amount to a user of the client device 106 if the user wins the bet.

In some embodiments, the server 102 can be a virtual server or a virtualized computing resource. For example, the server 102 can refer to a virtual server or cloud server hosted and delivered by a cloud computing platform (e.g., Amazon Web Services®, Microsoft Azure®, or Google Cloud®). In other embodiments, the server 102 can refer to one or more stand-alone servers such as a rack-mounted server, a blade server, a mainframe, a dedicated desktop or laptop computer, one or more processors or processor cores therein, or a combination thereof.

The server 102 can comprise one or more server processors, server memory units, and a server communication unit. The one or more server processors can be coupled to the server memory units and the server communication unit via high-speed buses.

The server processors can comprise one or more central processing units (CPUs), graphical processing units (GPUs), Application-Specific Integrated Circuits (ASICs), field-programmable gate arrays (FPGAs), microprocessors, digital signal processors, or a combination thereof. As a more specific example, at least one of the processors can be a 64-bit processor. The server processors can execute software stored in the server memory units to execute the methods or instructions described herein.

The server memory units can store software, data, logs, or a combination thereof. The server memory units can be a volatile memory or a non-volatile memory. For example, the server memory units can comprise a nonvolatile storage such as non-volatile random access memory (NVRAM), Flash memory, disk storage, or a volatile storage such as static random access memory (SRAM). The server memory units can be the main storage unit for the server 102.

The server communication unit can include one or more wired or wireless communication interfaces. For example, the server communication unit can be a network interface card of the server 102. The server communication unit can be a wireless modem or a wired modem. In one embodiment, the server communication unit can be a WiFi modem. In other embodiments, the server communication unit can be a 3G modem, a 4G modem, a 5G modem, an LTE modem, a Bluetooth™ component, a radio receiver, an antenna, or a combination thereof. The server 102 can transmit or receive packets or messages to the client devices 106 using the server communication unit.

The client devices 106 can communicate with the server 102 over one or more networks 104. In some embodiments, the networks 104 can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 102 and the client devices 106 can connect to the network(s) 104 using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The client devices 106 can transmit data and files to the server 102 and receive data and files from the server 102 via secure connections. The secure connections can be real-time bidirectional connections secured using one or more encryption protocols such as a secure sockets layer (SSL) protocol, a transport layer security (TLS) protocol, or a combination thereof. Additionally, data or packets transmitted over the secure connection can be encrypted using a Secure Hash Algorithm (SHA) or another suitable encryption algorithm. Data or packets transmitted over the secure connection can also be encrypted using an Advanced Encryption Standard (AES) cipher.

The server 102 can store data and information received from the client devices 106 in one or more databases 108. In some embodiments, the database 108 can be a relational database. As a more specific example, the database 108 can be a network database (NDB) cluster (e.g., a MySQL database cluster). In alternative embodiments, the database 108 can be a column-oriented database or a key-value database. The database 108 can be distributed among multiple storage nodes In certain embodiments, the database 108 can be stored in a server memory or storage unit.

The server 102 can also be communicatively coupled to at least one computing device 110 used by an administrator of the online sports betting platform. The administrator can access an administrator control panel via the computing device 110 to control the operations of the online sports betting platform.

As shown in FIG. 1, the server 102 can receive a request from a client device 106 to place a bet 112 on at least one sporting event 202 (see, e.g., FIG. 2A) having odds 114 associated with the sporting event 202. The request can also comprise a bet amount 116 of the bet 112. For example, the server 102 can receive a request from the client device 106 to place a bet 112 on a football or soccer match having odds 114 associated with the outcome of the match.

In some embodiments, the server 102 can also receive a request from the client device 106 to place a bet 112 on multiple sporting events 202. The multiple sporting events 202 can comprise a first sporting event having a first odds associated with the first sporting event and a second sporting event having second odds associated with the second sporting event. In this case, the server 102 can calculate a combined odds based in part on the first odds and the second odds. The combined odds can then be used by the server 102 to calculate the user's possible winnings.

Once the server 102 has verified that the user of the client device 106 is eligible to place the bet (e.g., the user has enough funds in an account associated with the user to place the bet 112 at the requested bet amount 116), the odds 114 and the bet amount 116 are passed to a bet spinner module 118 of the server 102.

The bet spinner module 118 can make certain initial calculations concerning a possible winning amount. For example, the bet spinner module 118 can calculate the possible winning amount based on the bet amount 116 and the odds 114 associated with the sporting event 202. As a more specific example, when the odds 114 are decimal odds, the bet spinner module 118 can multiply the odds 114 by the bet amount 116 to obtain the possible winning amount.

The bet spinner module 118 can also decide whether the user is eligible to have a net possible winning amount boosted or enhanced based on the amount of the possible winning amount. For example, a maximum threshold can be set such that a possible winning amount above the maximum threshold can disqualify the user's net possible winning amount from being boosted or enhanced.

If the possible winning amount of the bet 112 is below the maximum threshold, the bet spinner module 118 can pass the odds 114 and the bet amount 116 as inputs to a multiplier calculation engine 120 of the server 102.

The multiplier calculation engine 120 can calculate a plurality of probability ranges in order to determine whether a multiplier 302 (see, e.g., FIGS. 3 and 4A-4C) should be applied to the possible winning amount to boost or enhance the net possible winning amount. As will be discussed in more detail in later sections, each of the plurality of probability ranges can be associated with a multiplier 302 from a selection of multipliers or a non-multiplier (i.e., a 1× multiplier).

In some embodiments, the selection of multipliers 302 can comprise a 2× multiplier having a multiplier value of 2, a 3× multiplier having a multiplier value of 3, a 5× multiplier having a multiplier value of 5, a 10× multiplier having a multiplier value of 10, a 50× multiplier having a multiplier value of 50, and a 100× multiplier having a multiplier value of 100. In these embodiments, a first probability range can be associated with the 2× multiplier, a second probability range can be associated with the 3× multiplier, a third probability range can be associated with the 5× multiplier, a fourth probability range can be associated with the 10× multiplier, a fifth probability range can be associated with the 50× multiplier, a sixth probability range can be associated with the 100× multiplier, and a seventh probability range can be associated with the non-multiplier (i.e., the 1× multiplier).

The plurality of probability ranges can be calculated by first calculating a series of multiplier probabilities associated with the selection of multipliers and then using a cumulative distribution function (CDF) to establish boundary values for each of the probability ranges. At least some of the boundary values can be calculated using one or more multiplier probabilities. For example, at least some of the boundary values can be calculated by adding up several multiplier probabilities. The plurality of probability ranges calculated in this manner can be a series of non-overlapping numerical ranges.

In some embodiments, each of the multiplier probabilities ($p_{multiplier}$) can be calculated using the following expression:

$$p_{multiplier} = \left(\frac{\text{daily coefficient}}{\text{Multiplier value}}\right) \times \text{margin}$$

wherein the margin (also referred to as a betting margin) is calculated based on the odds 114 of the sporting event 202 and the daily coefficient 122 is a ratio calculated at least once per day. In some embodiments, the daily coefficient 122 can be calculated as a ratio between an accumulated or aggregate amount of all net boosted winning amounts paid to users of the online sports betting platform within a given period of time and the profit of the online sports betting platform accumulated or earned during this same period of time. Calculation of the daily coefficient will be discussed in more detail in later sections.

Table 1 below represents one example of probability ranges calculated for each of the multipliers 302 using a cumulative distribution function (CDF):

TABLE 1

| Probability Ranges for Multipliers Established using CDF: | |
| --- | --- |
| Multiplier: | Probability Range: |
| 100X | $0 < n \leq P_{100}$ |
| 50X | $P_{100} < n \leq P_{50} + P_{100}$ |
| 10X | $P_{50} + P_{100} < n \leq P_{10} + P_{50} + P_{100}$ |
| 5X | $P_{10} + P_{50} + P_{100} < n \leq P_5 + P_{10} + P_{50} + P_{100}$ |

TABLE 1-continued

| Probability Ranges for Multipliers Established using CDF: | |
| --- | --- |
| Multiplier: | Probability Range: |
| 3X | $P_5 + P_{10} + P_{50} + P_{100} < n \leq P_3 + P_5 + P_{10} + P_{50} + P_{100}$ |
| 2X | $P_3 + P_5 + P_{10} + P_{50} + P_{100} < n \leq P_2 + P_3 + P_5 + P_{10} + P_{50} + P_{100}$ |
| No multiplier (1X) | $P_2 + P_3 + P_5 + P_{10} + P_{50} + P_{100} < n < 1$ |

In some embodiments, the bet spinner module 118 of the server 102 can retrieve the daily coefficient 122 from the database 108. In other embodiments, the bet spinner module 118 can retrieve the daily coefficient 122 from a local configuration 124 stored as part of the server 102. The server 102 can update its local configuration 124 by querying the database 108 or another database accessible to the server 102 periodically.

As shown in FIG. 1, an administrator of the system 100 can also make certain changes to the local configuration 124 via a bet spinner control panel 126 of the administrator control panel. For example, the administrator of the system 100 can update or change the daily coefficient 122 when the administrator notices that the daily coefficient 122 is either too high or too low relative to a desired ratio predetermined by the online sports betting platform. For example, a low daily coefficient 122 can increase the chances that the users of the online sports betting platform are awarded a multiplier 302.

Once the plurality of probability ranges have been calculated, the multiplier calculation engine 120 can generate a random number (n) using a pseudo random number generator 128. The pseudo random number generator 128 can be configured such that the random number falls within one of the plurality of probability ranges.

In some embodiments, the pseudo random number generator 128 can be a cryptographically-secure pseudo random number generator. More specifically, the pseudo random number generator 128 can be a software implementation of the Fortuna pseudo random number generator algorithm (see https://github.com/seehuhn/fortuna). In other embodiments, the pseudo random number generator 128 can be another type of digital random number generator.

In certain embodiments, the pseudo random number generator 128 can be seeded or re-seeded using a seed file. In other embodiments, the pseudo random number generator 128 can be seeded or re-seeded using an entropy accumulator to collect random numbers from a computing environment such as the times between server requests.

In some embodiments, the plurality of probability ranges can be a series of non-overlapping numerical ranges bounded by 0 as the smallest boundary value and 1 as the largest boundary value. In these embodiments, the pseudo random number generator 128 can be configured such that the random number (n) generated is a number between 0 and 1.

Once the random number has been generated, the multiplier calculation engine 120 can select the multiplier 302 associated with a particular probability range when that particular probability range encompasses the random number generated. That is, the multiplier calculation engine 120 can select the multiplier 302 associated with a particular probability range when the random number generated by the pseudo random number generator 128 falls within that particular probability range. In all cases, the random number either falls within a probability range associated with a specific multiplier 302 or the probability range associated with the non-multiplier (i.e., the 1× multiplier).

If the multiplier calculation engine 120 returns a multiplier 302, the bet spinner module 118 can calculate a boosted possible payout amount 304 (see, e.g., FIGS. 3 and 4) based in part on the bet amount 116, the odds 114, and the multiplier 302. In this case, the bet spinner module 118 can transmit instructions to the client device 106 to reveal the boosted possible payout amount 304 and the multiplier 302 via a slot machine graphic 300 rendered on a display of the client device 106.

As will be discussed in more detail in the following sections, the slot machine graphic 300 can comprise a plurality of reels 306 that appear to rotate graphically. Each of the reels 306 can comprise symbols 308 associated with the various multipliers 302. The multiplier 302 awarded to the user can be revealed to the user by graphically rotating all of the reels 306 and each of the reels 306 can successively stop on the symbol 308 associated with the awarded multiplier 302. In this manner, all three reels 306 stop on the same symbol 308 associated with the awarded multiplier 302 such that the symbols 308 are arranged in one horizontal payline or otherwise aligned horizontally. If the user ends up winning the bet 112, the user of the client device 106 wins the boosted possible payout amount 304 rather than the possible winning amount.

If the random number generated falls within the probability range associated with the non-multiplier, the user is still shown the slot machine graphic 300 with reels 306 that rotate. However, in this case, at least one of the reels 306 of the slot machine graphic 300 stops on a symbol 308 that is different from a symbol 308 shown on one of the other reels 306. The rotation of the reels 306 of the slot machine graphic 300 can be varied such that the user does not see the same reel outcome every time that the user ends up with the non-multiplier. In this manner, the user feels the thrill of seeing the slot machine graphic 300 every time a bet 112 is placed. This incentivizes the user to continue to engage with the online sports betting platform and to continue to place bets 112 with the online sports betting platform.

It has been discovered by the applicant that user engagement with the online sports betting platform increases once users are shown the slot machine graphic 300 after placing a bet 112. Moreover, the applicant discovered that user engagement with the online sports betting platform increased significantly once users were awarded a multiplier 302 that enhanced or boosted the user's possible winnings.

Figure 2A:
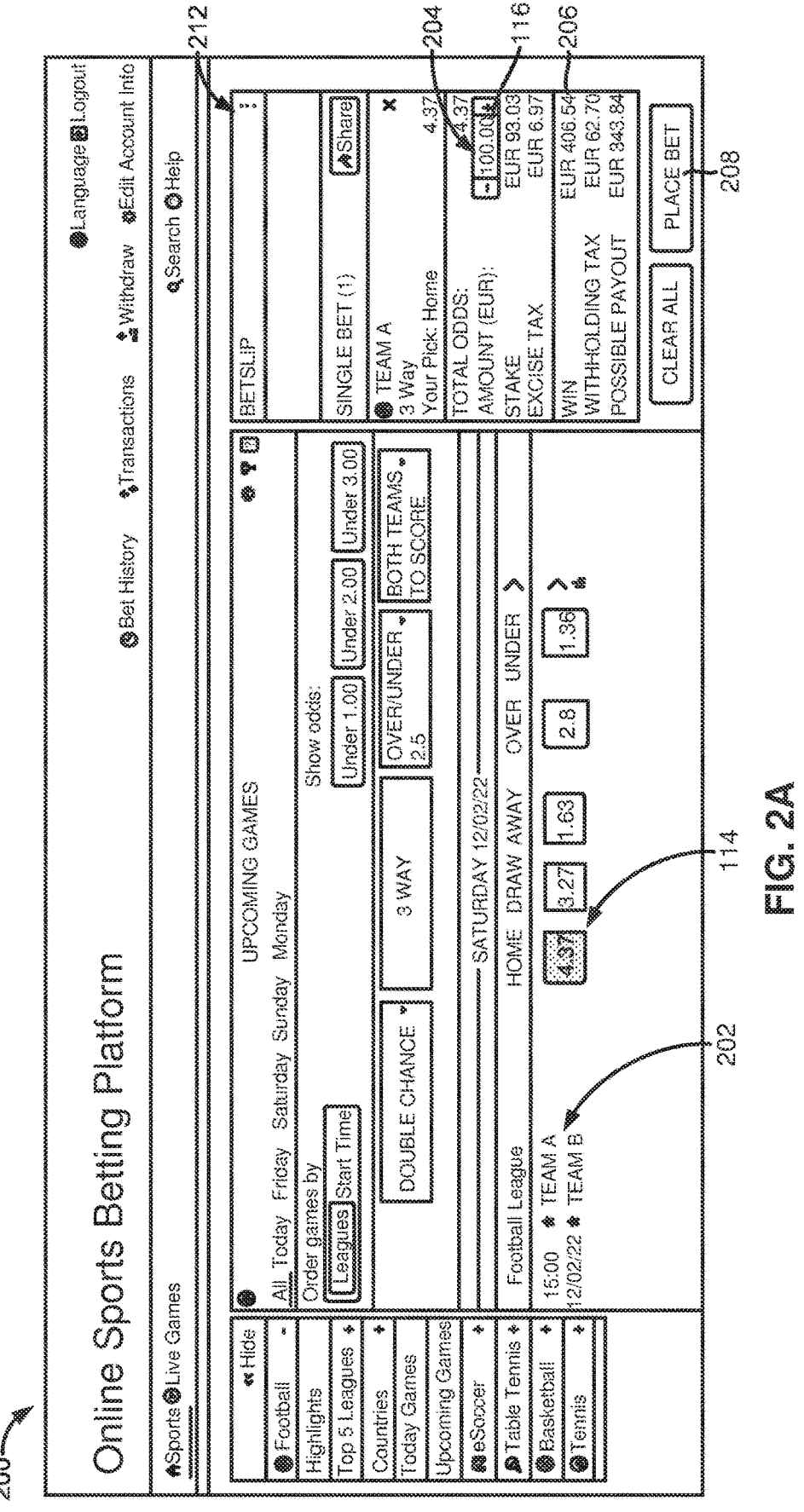
FIG. 2A illustrates one embodiment of a bet placement graphic user interface (GUI).

FIG. 2A illustrates one embodiment of a bet placement GUI 200. The bet placement GUI 200 can be rendered on a display of the client device 106. A user can apply one or more user inputs to the bet placement GUI 200 to place a bet 112 on the outcome of at least one sporting event 202 with the online sports betting platform.

As shown in FIG. 2A, the bet placement GUI 200 can display odds 114 associated with several possible outcomes of the sporting event 202. In some embodiments, the odds 114 displayed can be decimal odds (also referred to as European odds). In other embodiments, the odds 114 associated with the sporting event 202 can be displayed as American odds or fractional odds. In some embodiments, the American odds or fractional odds can be converted to decimal odds before proceeding with any calculations concerning possible winnings or payouts.

In placing a bet 112, the user selects the odds 114 associated with one outcome of the sporting event 202. For example, the bet placement GUI 200 can display the odds 114 of Team A winning a football match against Team B at home as 4.37. The user can apply a user input to a graphic displaying the 4.37 odds if the user wishes to place a bet 112 on Team A winning at home.

The bet placement GUI 200 can also display the odds 114 of the football match between Team A and Team B ending in a draw and the odds 114 of Team B winning the football match on the road. Although the odds 114 selected by the user is used to calculate the user's possible winnings, the odds 114 associated with all of the possible outcomes of the sporting event 202 can be provided as inputs to the server 102 in order to calculate the margin. Calculation of the margin will be discussed in more detail in the following sections.

In other embodiments not shown in FIG. 2A, the user can place a bet 112 on the outcome of the sporting event 202 by applying a user input to one or more graphics displaying team name(s).

The user can input a bet amount 116 for the bet 112 by typing in the bet amount 116 into a bet amount input window 204 of the bet placement GUI 200. The user can also input a bet amount 116 or adjust the bet amount 116 by applying one or more user inputs to a set of increment and decrement buttons.

As shown in FIG. 2A, the server 102 can automatically calculate any excise taxes applied to the bet amount 116. Moreover, when the user is placing the bet 112 in a jurisdiction where a withholding tax is applied to a possible payout, such taxes are automatically calculated and factored into the possible payout amounts shown to the user. Calculation of taxes will be discussed in more detail in later sections.

The server 102 can also calculate a possible winning amount 206 based on the bet amount 116 and the odds 114 associated with the outcome of the sporting event 202 selected by the user. The possible winning amount 206 can be displayed to the user before the user places the bet.

As shown in FIG. 2A, the user can place the bet 112 by applying a user input to a bet placement button 208. Alternatively, the user can apply a user input to a "Clear All" button to start over again.

Although FIG. 2A illustrates the user placing a bet 112 on only one sporting event 202, the bet placement GUI 200 can also allow the user to place a bet 112 on multiple sporting events 202. For example, the user can place a bet 112 on at least a first sporting event and a second sporting event. The first sporting event can have a first odds associated with the first sporting event and the second sporting event can have a second odds associated with the second sporting event. In this example scenario, the server 102 can calculate a combined odds based in part on the first odds and the second odds. Moreover, the server 102 can calculate a possible winning amount 206 based on the bet amount 116 and the combined odds.

Figure 2B:
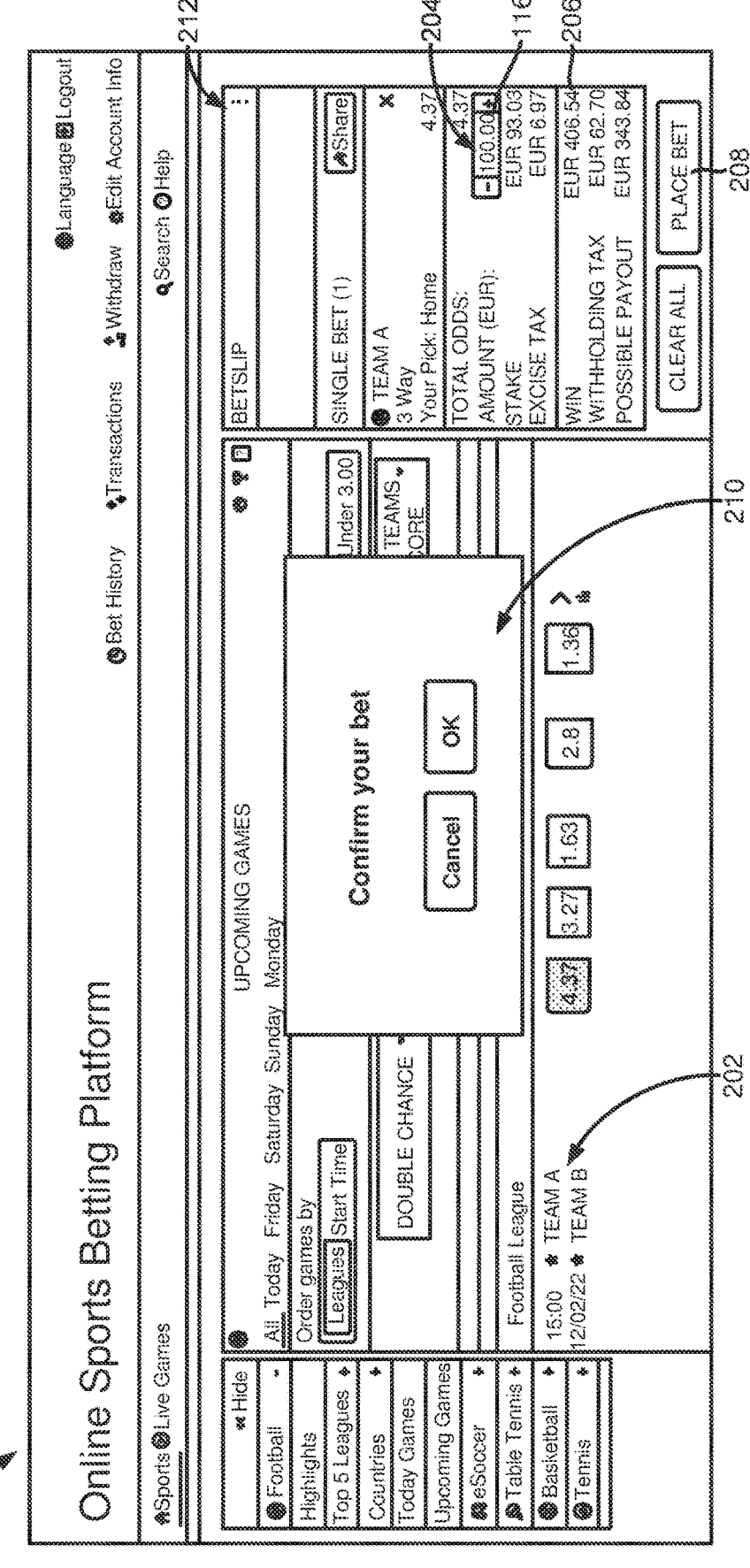
FIG. 2B illustrates another embodiment of the bet placement GUI with a pop-up window prompting a user to confirm a bet.

FIG. 2B illustrates that once the bet placement button 208 is clicked, a pop-up window 210 can appear that asks the user to confirm the bet 112. In response to the user confirming the bet 112 (for example, by applying a user input to an "OK" button), the server 102 can receive the request from the client device 106 to place the bet 112 along with the bet amount 116 and the odds 114 associated with the sporting event 202.

In response to the user confirming the bet 112, the bet spinner module 118 can pass the odds 114 and the bet amount 116 received from the client device 106 as inputs to the multiplier calculation engine 120 of the server 102. As previously discussed, the multiplier calculation engine 120 can use the bet amount 116 and the odds 114 as inputs to determine whether the user should be awarded a multiplier 302 (see, e.g., FIG. 3) to boost the user's possible winnings.

As part of this determination, the multiplier calculation engine 120 can begin by calculating probability ranges for the possible multipliers 302. For example, the possible multipliers 302 can include a 2× multiplier having a multiplier value of 2, a 3× multiplier having a multiplier value of 3, a 5× multiplier having a multiplier value of 5, a 10× multiplier having a multiplier value of 10, a 50× multiplier having a multiplier value of 50, and a 100× multiplier having a multiplier value of 100.

The plurality of probability ranges can be calculated by first calculating a series of multiplier probabilities associated with the selection of multipliers 302 and then using a cumulative distribution function (CDF) to establish boundary values for each of the probability ranges.

The multiplier probabilities ($p_{multiplier}$) can be calculated using the following expression:

$$p_{multiplier} = \left(\frac{\text{daily coefficient}}{\text{Multiplier value}}\right) \times \text{margin}$$

Going off the example bet shown in FIGS. 2A and 2B, the margin (also referred to as a bookmaker's margin or betting margin) can be calculated using one or more equations that take into account all of the odds associated with the sporting event 202. For example, the margin can be calculated using an equation that factors in not only the odds 114 associated with the outcome selected by the user (e.g., Team A winning at home) but also the odds 114 associated with the other outcomes (e.g., Team B winning on the road and the match ending in a draw).

As a more specific example, the margin can be calculated using Equation 1 below:

$$\text{Margin} = \frac{1}{\text{Odds}_{Home}} + \frac{1}{\text{Odds}_{Away}} + \frac{1}{\text{Odds}_{Draw}} - 1 \qquad \text{[Equation 1]}$$

Using the odds associated with the previous example involving the football match between Team A and Team B (home win for Team A odds=4.37, away win for Team B odds=1.63, and odds for draw=3.47), the margin can be calculated as:

$$\text{Margin} = \frac{1}{4.37} + \frac{1}{1.63} + \frac{1}{3.47} - 1 = 0.129$$

Although the margin is shown as being calculated using Equation 1 above, it should be understood by one of ordinary skill in the art of online sports betting that the margin can also be calculated using other margin calculation equations such as those for double chance bets.

Moreover, the bet spinner module 118 can also retrieve a daily coefficient 122 (see, e.g., FIG. 5) in order to calculate the various multiplier probabilities. As previously discussed, the bet spinner module 118 can retrieve the daily coefficient 122 from the database 108. In other embodiments, the bet spinner module 118 can retrieve the daily coefficient 122 from a local configuration 124 stored as part of the server 102.

For purposes of the below example calculations, the daily coefficient 122 can be calculated as 0.010337698. As previously discussed, the daily coefficient 122 is a ratio that is calculated at least once per day. In certain embodiments, the daily coefficient 122 is calculated as a ratio between an accumulated amount of all net boosted winning amounts paid to users of the online sports betting platform during a given period of time (e.g., several days, one week, one month, etc.) and an accumulated company profit made by the online sports betting platform during this same given period of time (see, e.g., FIG. 5).

Once the margin has been calculated using the odds 114 and the daily coefficient 122, the various multiplier probabilities ($p_{multiplier}$) can be calculated using the following expression:

$$p_{multiplier} = \left(\frac{0.010337698}{\text{Multiplier value}}\right) \times 0.129$$

$$p_{100} = \left(\frac{0.010337698}{100}\right) \times 0.129 = 0.00001333563$$

$$p_{50} = \left(\frac{0.010337698}{50}\right) \times 0.129 = 0.00002667126$$

$$p_{10} = \left(\frac{0.010337698}{10}\right) \times 0.129 = 0.0001333563$$

$$p_{5} = \left(\frac{0.010337698}{5}\right) \times 0.129 = 0.0002667126$$

$$p_{3} = \left(\frac{0.010337698}{3}\right) \times 0.129 = 0.000444521$$

$$p_{2} = \left(\frac{0.010337698}{2}\right) \times 0.129 = 0.0006667815$$

Using the above multiplier probabilities ($p_{multiplier}$), the probability ranges for the various multipliers can be calculated according to Table 1 above:

| Multiplier: | Probability Range: |
|---|---|
| 100X | $0 < n \leq 0.00001333563$ |
| 50X | $0.00001333563 < n \leq 0.00004000689$ |
| 10X | $0.00004000689 < n \leq 0.00017336319$ |
| 5X | $0.00017336319 < n \leq 0.00044007579$ |
| 3X | $0.00044007579 < n \leq 0.00088459679$ |
| 2X | $0.00088459679 < n \leq 0.00155137829$ |
| No multiplier (1X) | $0.00155137829 < n < 1$ |

Once the plurality of probability ranges have been calculated, the multiplier calculation engine 120 can generate a random number (n) using the pseudo random number generator 128. For example, if the random number (n) generated is 0.00064759673, the multiplier calculation engine 120 can generate as an output, a multiplier 302 of 3×. The multiplier 302 and a boosted possible payout amount 304 calculated using the multiplier 302 can then be revealed to the user via a slot machine graphic 300 (see FIG. 3).

Figure 3:
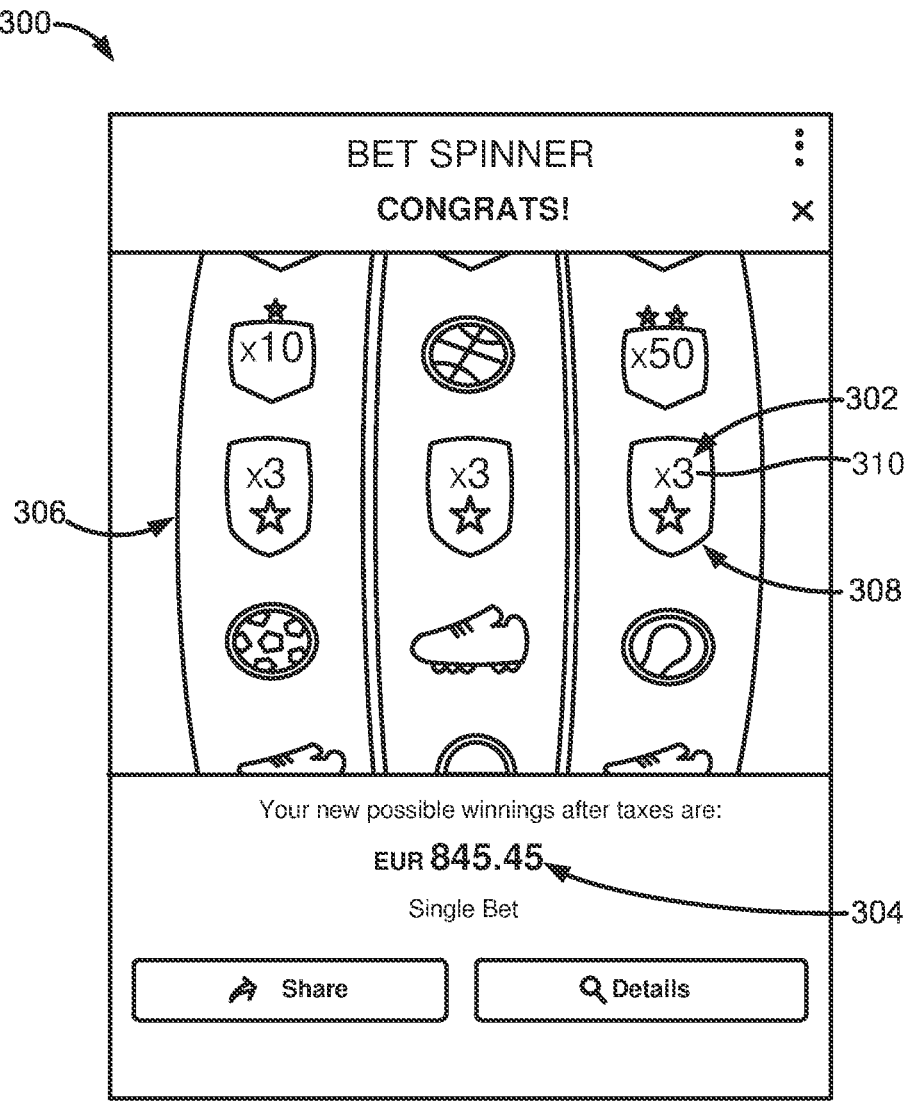
FIG. 3 illustrates one embodiment of a slot machine graphic for revealing a multiplier and a boosted possible payout amount to the user.

FIG. 3 illustrates one embodiment of a slot machine graphic 300 that can be rendered on a display of the client device 106. The slot machine graphic 300 can be displayed in response to the user confirming the placement of the bet 112. The slot machine graphic 300 can be displayed to reveal whether a multiplier 302 has been awarded to the user as a result of the calculations made by the multiplier calculation engine 120. The slot machine graphic 300 can also reveal a boosted possible payout amount 304 once the multiplier 302 has been revealed. As previously discussed, the boosted possible payout amount 304 can be calculated based in part on the possible winning amount 206 and the multiplier 302 (see also, FIGS. 4A-4C).

In some embodiments, the slot machine graphic 300 can be displayed as part of the bet placement GUI 200. For example, the slot machine graphic 300 can be displayed in a section of the bet placement GUI 200 formerly occupied by a betslip graphic 212 (see, e.g., FIG. 2A).

In other embodiments, the slot machine graphic 300 can be displayed via a pop-up window or in a separate screen or page of the online sports betting platform.

As shown in FIG. 3, the slot machine graphic 300 can comprise a plurality of reels 306. For example, the slot machine graphic 300 can comprise three reels 306. In other embodiments, slot machine graphic 300 can comprise four or more reels 306, two reels 306, or even one reel 306. The slot machine graphic 300 can be rendered such that the reels 306 appear to rotate or spin graphically.

Each of the reels 306 can comprise a plurality of symbols 308 including symbols 308 associated with the various multipliers 302. Each of the symbols 308 associated with a multiplier 302 can display a multiplier value 310 next to a multiplication sign (×) or times sign within a graphic icon.

Each of the reels 306 can comprise symbols 308 associated with all of the multipliers 302 (e.g., symbols 308 associated with the 2× multiplier, the 3× multiplier, the 5× multiplier, the 10× multiplier, the 50× multiplier, and the 100× multiplier) as well as symbols 308 not associated with the multipliers 302.

The multiplier 302 awarded can be revealed to the user by graphically rotating all of the reels 306 and each of the reels 306 can successively stop (e.g., beginning with the far left reel 306) on the symbol 308 associated with the awarded multiplier 302. Once the reels 306 stop, the symbols 308 associated with the awarded multiplier 302 can be arranged in one row or one horizontal line (also known as a payline) visible to the user. FIG. 3 illustrates an example of the slot machine graphic 300 displaying a payline of symbols 308 associated with the 3× multiplier.

FIG. 3 also illustrates that the boosted possible payout amount 304 can be displayed once the reels 306 have come to a stop. If the user ends up winning the bet 112, the user of the client device 106 will win the boosted possible payout amount 304 rather than the possible winning amount.

In most cases, the random number (n) generated by the pseudo random number generator 128 will fall within the probability range associated with the non-multiplier (i.e., the 1× multiplier). In these cases, the user is still shown the slot machine graphic 300 with reels 306 that rotate or spin. However, in these cases, at least one of the reels 306 of the slot machine graphic 300 stops on a symbol 308 that is different from a symbol 308 shown on one of the other reels 306. In this manner, at least one symbol 308 shown in the payline is different from one of the other symbols 308 in the payline. As a more specific example, when the user is not awarded a multiplier 302, the payline of the slot machine graphic 300 includes at least one symbol not associated with a multiplier 302 (e.g., a sports icon or ball icon) or includes at least two symbols 308 associated with different multipliers 302.

In embodiments where the slot machine graphic 300 only has one reel 306, the reel 306 will simply stop on a symbol 308 not associated with a multiplier 302.

The rotation of the reels 306 of the slot machine graphic 300 can be varied or follow a non-predictable pattern such that the user does not see the same reel outcome every time that the user ends up with the non-multiplier.

In some embodiments, the rotation of the reels 306 can be dictated in part by a random number generator. In certain embodiments, the rotation of the reels 306 can be dictated in part by a different random number generator than the pseudo random number generator 128.

In this manner, the system 100 is designed such that the user feels the thrill of seeing the slot machine graphic 300 every time a bet 112 is placed. This incentives the user to continue to engage with the online sports betting platform and to continue to place bets 112 with the online sports betting platform in hopes of being awarded a multiplier 302.

In some embodiments, the slot machine graphic 300 and the bet placement GUI 200 can be created using any of the following programming languages: HTML, CSS, Javascript, Java®, React, Vue, JQuery, Angular, Swift, or a combination thereof.

In these embodiments, any of the modules and engines running on the server 102 can be written in the following programming languages: JavaScript, Java®, Node.JS, Ruby, Python, C, C++, or a combination thereof.

Figure 4A:
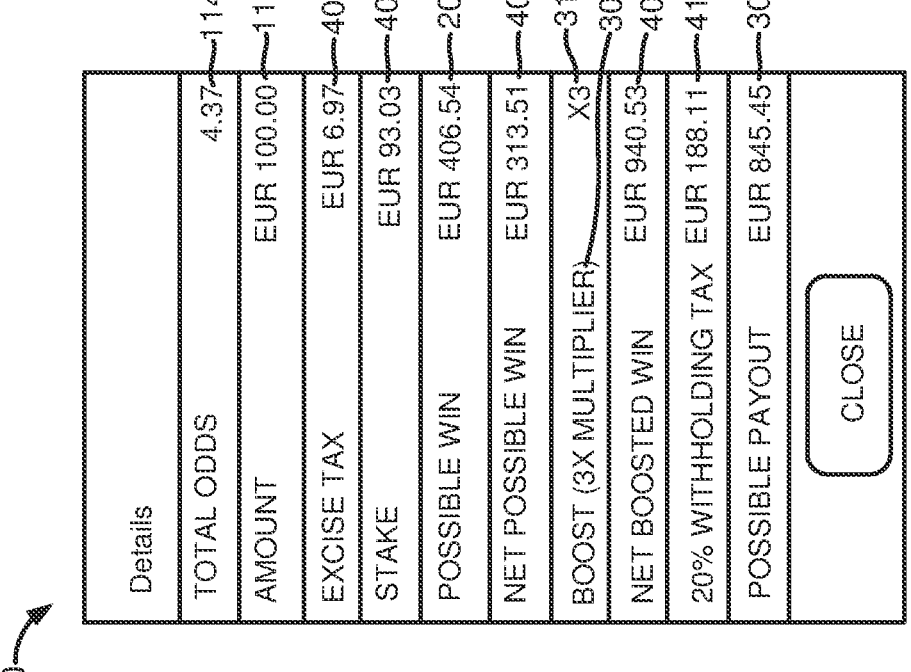
FIG. 4A illustrates one embodiment of a pop-up window displaying a series of tax calculations associated with a possible winning bet.

FIG. 4A illustrates one embodiment of a pop-up window 400 that can be displayed to a user via the client device 106 showing certain taxes factored into the calculation of the user's boosted possible payout amount 304. In the scenario depicted in FIG. 4A, the user resides in a jurisdiction that has both an excise tax and a withholding tax. In this case, the server 102 can calculate an excise tax amount 402 based on the bet amount 116 and an excise tax rate. For example, the excise tax amount 402 can be calculated by multiplying the bet amount 116 by the excise tax rate. The server 102 can then subtract the excise tax amount 402 from the bet amount 116 to obtain a post-tax bet amount 404 (also referred to as the user's stake). The server 102 can then calculate a possible winning amount 206 based on the post-tax bet amount 404 and the odds 114 associated with an outcome of the sporting event 202 selected by the user. For example, when the odds 114 are decimal odds, the server 102 can calculate the possible winning amount 206 by multiplying the post-tax bet amount 404 by the odds 114 associated with the outcome of the sporting event 202 selected by the user. The server 102 can then subtract the post-tax bet amount 404 from the possible winning amount 206 to obtain a net possible winning amount 406. The server 102 can then multiply a multiplier value 310 of the multiplier 302 by the net possible winning amount 406 to obtain a net possible boosted taxable winning amount 408. The server 102 can also calculate a withholding tax amount 410 by multiplying a withholding tax rate by the net possible boosted taxable winning amount 408. The server 102 can then calculate the boosted possible payout amount 304 by adding the net possible boosted taxable winning amount 408 to the post-tax bet amount 404 and then subtracting the withholding tax amount 410.

As previously discussed, the boosted possible payout amount 304 is the amount revealed to the user via the slot machine graphic 300 (see, e.g., FIG. 3). When the user resides in a jurisdiction that has both an excise tax and a withholding tax, such taxes are factored into the calculation of the boosted possible payout amount 304 and disclosed fully to the user via interfaces such as the pop-up window 400. This way, the user is not surprised when the boosted possible payout amount 304 is lower than what the user expects.

Figure 4C:
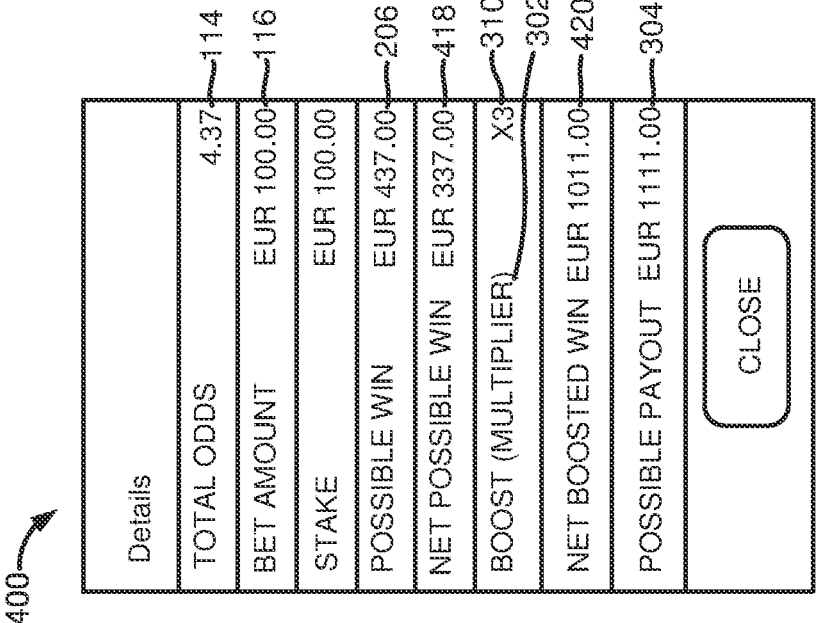
FIG. 4C illustrates yet another embodiment of a pop-up window displaying calculations associated with a possible winning bet.
Figure 4B:
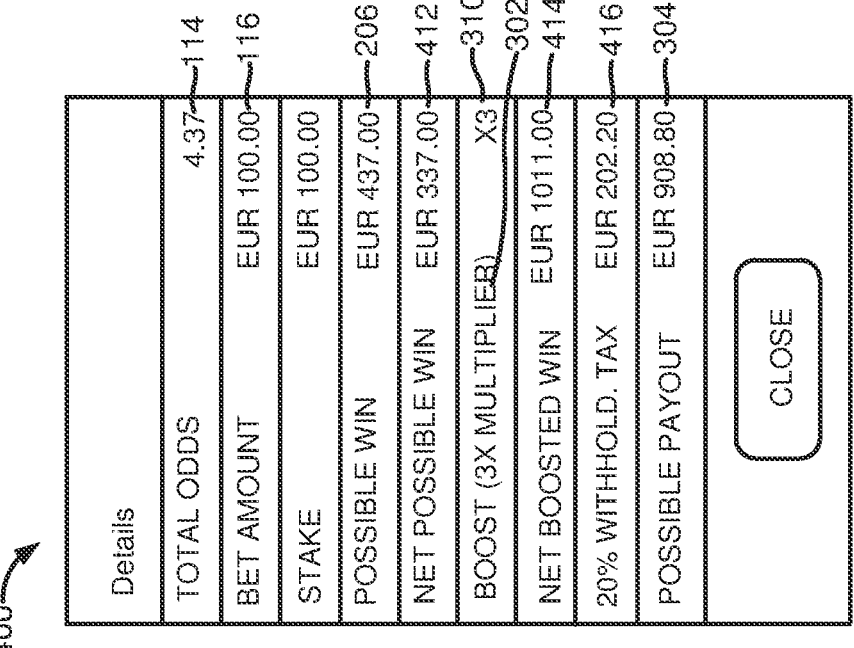
FIG. 4B illustrates another embodiment of a pop-up window displaying a different series of tax calculations associated with a possible winning bet.

FIG. 4B illustrates another embodiment of a pop-up window 400 that can be displayed to a user via the client device 106 showing only a withholding tax factoring into the calculation of the user's boosted possible payout amount 304. In the scenario depicted in FIG. 4B, the user resides in a jurisdiction that subjects the user's possible winnings to the withholding tax.

In this case, the server 102 can first calculate the possible winning amount 206 by multiplying the bet amount 116 by the odds 114 associated with the outcome of the sporting event 202 selected by the user. The server 102 can then subtract the bet amount 116 from the possible winning amount 206 to obtain a net possible winning amount 412.

The server 102 can then multiply a multiplier value 310 of the multiplier 302 by the net possible winning amount 412 to obtain a net possible boosted taxable winning amount 414.

The server 102 can then calculate a withholding tax amount 416 by multiplying a withholding tax rate by the net possible boosted taxable winning amount 414. The server 102 can then calculate the boosted possible payout amount 304 by adding the net possible boosted taxable winning amount 414 to the bet amount 116 and then subtracting the withholding tax amount 416.

As previously discussed, the boosted possible payout amount 304 is the amount revealed to the user via the slot machine graphic 300 (see, e.g., FIG. 3). When the user resides in a jurisdiction that has a withholding tax, such taxes are factored into the calculation of the boosted possible payout amount 304 and disclosed fully to the user via interfaces such as the pop-up window 400. This way, the user is not surprised when the boosted possible payout amount 304 is lower than what the user expects.

FIG. 4C illustrates yet another embodiment of a pop-up window 400 that can be displayed to a user via the client device 106 showing the calculation of the user's boosted possible payout amount 304. In the scenario depicted in FIG. 4B, the user resides in a jurisdiction that does not subject the user's possible winnings to any taxes.

In this case, the server 102 can first calculate the possible winning amount 206 by multiplying the bet amount 116 by the odds 114 associated with the outcome of the sporting event 202 selected by the user. The server 102 can then subtract the bet amount 116 from the possible winning amount 206 to obtain a net possible winning amount 418. The server 102 can then multiply a multiplier value 310 of the multiplier 302 by the net possible winning amount 412 to obtain a net possible boosted winning amount 420. The server 102 can then calculate the boosted possible payout amount 304 by adding the bet amount 116 to the net possible boosted winning amount 420.

Figure 5:
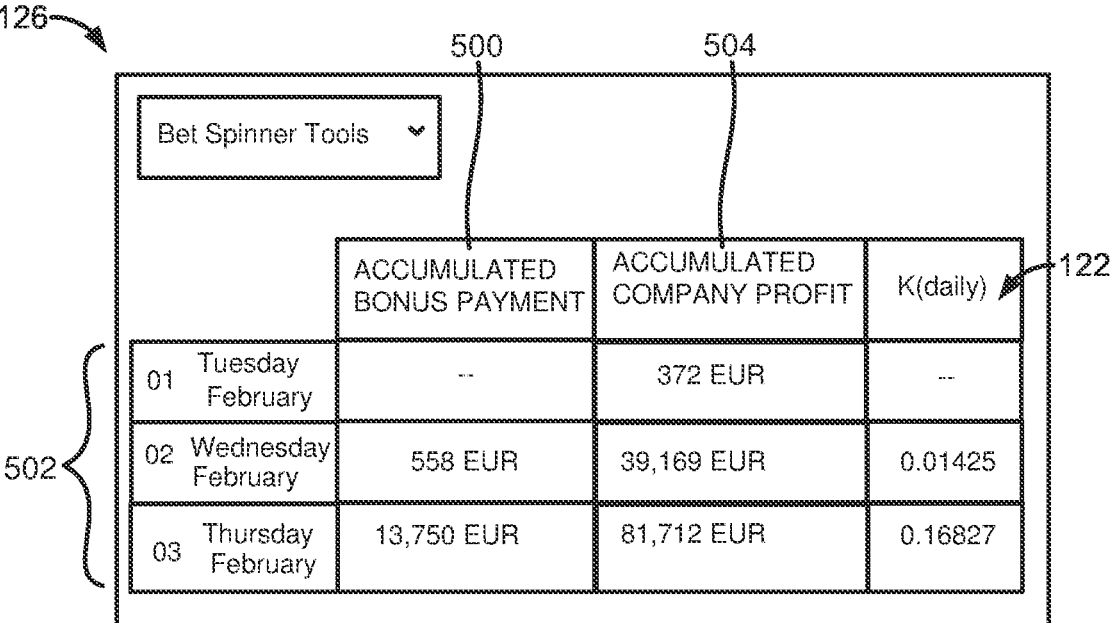
FIG. 5 illustrates one embodiment of an administrator panel for monitoring and controlling certain parameters of the system including allowing an administrator to manually adjust a daily coefficient.

FIG. 5 illustrates one embodiment of part of a bet spinner control panel 126 that can be used by an administrator of the system 100 to modify the daily coefficient 122. As previously discussed, the daily coefficient 122 is used in part to calculate the multiplier probabilities, which are, in turn, used to calculate the probability ranges for the various multipliers 302.

In some embodiments, the daily coefficient 122 can be a ratio calculated by dividing an accumulated amount of all net boosted winning amounts 500 (also referred to as an accumulated bonus payment) paid out to users of the online sports betting platform within a given period of time 502 divided by an accumulated company profit 504 earned by the online sports betting platform during the same period of time 502. For example, as shown in FIG. 5, a daily coefficient of 0.16827 can be calculated by dividing 13,750 Euros (EUR), the amount of all net boosted winning amounts 500 paid to users in the first three days of the month of February, by 81,712 EUR, the total amount of profit 504 earned by the online sports betting platform during the first three days of the month of February.

The daily coefficient 122 can be calculated at least once per day. For example, the daily coefficient 122 can be calculated automatically by the server 102 based on bonus payment and revenue data obtained from the database 108. In other embodiments, the daily coefficient 122 can be calculated by an administrator of the system 100.

In certain embodiments, the daily coefficient 122 can be adjusted by an administrator of the system 100 if the daily coefficient 122 falls below a coefficient threshold set in advance by the online sports betting platform. For example, the administrator can adjust the daily coefficient 122 by applying certain user inputs to the bet spinner control panel 126. As a more specific example, the administrator can adjust the daily coefficient 122 by entering a new daily coefficient 122 (e.g., by typing in a new daily coefficient 122) that replaces a previously calculated daily coefficient 122 or a previous instance of the daily coefficient 122 retrieved from the database 108.

Adjusting the daily coefficient 122 can affect the multiplier probabilities, which, in turn, can affect the probability ranges. As such, adjusting the daily coefficient 122 can affect the chances that users of the online sports betting platform are awarded multipliers 302. For example, when an administrator decreases the daily coefficient 122, the chances that a user of the platform is awarded a multiplier 302 increases. Moreover, when an administrator increases the daily coefficient 122, the chances that a user of the platform is awarded a multiplier 302 decreases.

The system 100 allows an administrator of the system 100 the ability to adjust the daily coefficient 122 in order to safeguard the financial health or solvency of the online sports betting platform and to ensure that a predetermined percentage of the gross gaming revenue of the online sports betting platform is paid out in the form of boosted winning payments in order to incentivize users to continue placing bets 112 on the platform.

FIG. 6 illustrates that a multiplier coefficient 600 can be applied to one or more of the multiplier probabilities. The multiplier coefficient 600 can be applied to a multiplier probability by multiplying the multiplier coefficient 600 by the multiplier probability.

The multiplier coefficient 600 can be a number greater than 0 but less than or equal to 1.00. The multiplier coefficient 600 can be adjusted by an administrator via the bet spinner control panel 126.

In some embodiments, the same multiplier coefficient 600 can be applied to all of the multiplier probabilities. In other embodiments, a different multiplier coefficient 600 can be applied to each of the multiplier probabilities.

When the multiplier coefficient 600 is equal to 1.00, the multiplier probability can remain the same. However, when a multiplier coefficient 600 is between 0 and 1.00, the multiplier coefficient can reduce the multiplier probability and shift the probability range associated with the multiplier probability as well as all subsequent probability ranges.

For example, a multiplier probability ($p_{multiplier}$) for the 100× multiplier can initially be calculated as 0.0000015. Moreover, in this example, a multiplier probability for the 50× multiplier can be calculated as 0.0000030.

Using these multiplier probabilities, the probability range for the 100× multiplier can initially be calculated as $0 < n \leq 0.0000015$ and the probability range for the 50× multiplier can initially be calculated as $0.0000015 < n \leq 0.0000045$.

In this example, a multiplier coefficient of 0.10 can be applied to the 100× multiplier probability (see FIG. 6). By doing so, the $p_{multiplier}$ for the 100× multiplier can then become 0.00000015. The probability range for the 100× multiplier can then become $0 < n \leq 0.00000015$ and the prob-

17

18 ability range for the 50× multiplier can become $0.00000015 < n \leq 0.00000315$. Similarly, all of the subsequent probability ranges can be shifted such that the end result is that the probability range for the 1× multiplier or the non-multiplier is larger.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps or operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example, 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method for increasing user engagement with sports betting, comprising:

receiving, at a server, a request from a client device to place a bet on at least one sporting event having odds associated with the sporting event, wherein the request comprises a bet amount;

calculating a plurality of probability ranges, wherein each of the plurality of probability ranges is associated with a multiplier from a selection of multipliers or a non-multiplier;

generating, at the server, a random number using a pseudo random number generator, wherein the random number is a number that falls within one of the plurality of probability ranges;

selecting the multiplier associated with a particular probability range when the random number generated by the pseudo random number generator falls within the particular probability range;

calculating, at the server, a boosted possible payout amount based in part on the bet amount, the odds, and the multiplier; and transmitting instructions to the client device to reveal the boosted possible payout amount and the multiplier via a slot machine graphic rendered on a display of the client device after the bet is placed, and wherein winning the bet associated with the sporting event results in a user of the client device winning the boosted possible payout amount.

2. The method of claim 1, wherein the boosted possible payout amount is calculated by:

calculating, at the server, a possible winning amount based in part on the bet amount and the odds associated with the sporting event;

subtracting the bet amount from the possible winning amount to obtain a net possible winning amount;

multiplying a multiplier value of the multiplier by the net possible winning amount to obtain a net possible boosted winning amount; and adding the net possible boosted winning amount to the bet amount to obtain the boosted possible payout amount.

3. The method of claim 1, wherein the boosted possible payout amount is calculated by:

calculating, at the server, an excise tax amount based on the bet amount and an excise tax rate;

subtracting the excise tax amount from the bet amount to yield a post-tax bet amount;

calculating a possible winning amount based in part on the post-tax bet amount and the odds associated with the sporting event;

subtracting the post-tax bet amount from the possible winning amount to obtain a net possible winning amount;

multiplying a multiplier value of the multiplier by the net possible winning amount to obtain a net possible boosted taxable winning amount;

calculating a withholding tax amount by multiplying a withholding tax rate by the net possible boosted taxable winning amount; and adding the net possible boosted taxable winning amount to the post-tax bet amount and then subtracting the withholding tax amount to obtain the boosted possible payout amount.

4. The method of claim 1, wherein the boosted possible payout amount is calculated by:

calculating, at the server, a possible winning amount based in part on the bet amount and the odds associated with the sporting event;

subtracting the bet amount from the possible winning amount to obtain a net possible winning amount;

multiplying a multiplier value of the multiplier by the net possible winning amount to obtain a net possible boosted taxable winning amount;

calculating a withholding tax amount by multiplying a withholding tax rate by the net possible boosted taxable winning amount; and adding the net possible boosted taxable winning amount to the bet amount and then subtracting the withholding tax amount to obtain the boosted possible payout amount.

5. The method of claim 1, wherein the slot machine graphic comprises a plurality of reels, wherein each of the reels comprises at least one symbol associated with the multiplier, and wherein the multiplier is revealed by graphically rotating all of the reels and successively stopping each of the reels on the symbol associated with the multiplier.

6. The method of claim 1, wherein the selection of multipliers comprises a 2× multiplier having a multiplier value of 2, a 3× multiplier having a multiplier value of 3, a 5× multiplier having a multiplier value of 5, a 10× multiplier having a multiplier value of 10, a 50× multiplier having a multiplier value of 50, or a 100× multiplier having a multiplier value of 100.

7. The method of claim 6, wherein the plurality of probability ranges are calculated by:

calculating a multiplier probability ($p_{multiplier}$) associated with each of the multipliers from the selection of multipliers; and using a cumulative distribution function to establish boundary values for each of the probability ranges, wherein at least some of the boundary values are calculated using one or more multiplier probabilities, and wherein the plurality of probability ranges are non-overlapping numerical ranges.

8. The method of claim 7, wherein the multiplier probability ($p_{multiplier}$) is calculated using the following expression:

$$p_{multiplier} = \left(\frac{\text{daily coefficient}}{\text{Multiplier value}}\right) \times \text{margin}$$

wherein the margin is calculated based on the odds of the sporting event, and wherein the daily coefficient is a ratio calculated at least once per day.

9. The method of claim 8, where the server stores the daily coefficient as part of a local configuration on the server and wherein the server updates the local configuration by querying a network database periodically.

10. The method of claim 1, further comprising:

receiving, at the server, a request from the client device to place the bet on multiple sporting events comprising a first sporting event having a first odds associated with the first sporting event and a second sporting event having a second odds associated with the second sporting event;

calculating a combined odds based in part on the first odds and the second odds; and calculating, at the server, the possible winning amount based on the bet amount and the combined odds.

11. A system for increasing user engagement with sports betting, comprising:

a server communicatively coupled to a plurality of client devices, wherein the server comprises one or more server processors programmed to:

receive a request from one of the client devices to place a bet on at least one sporting event having odds associated with the sporting event, wherein the request comprises a bet amount;

calculate a plurality of probability ranges, wherein each of the plurality of probability ranges is associated with a multiplier from a selection of multipliers or a non-multiplier;

generate a random number using a pseudo random number generator, wherein the random number is a number that falls within one of the plurality of probability ranges;

select the multiplier associated with a particular probability range when the random number generated by the pseudo random number generator falls within the particular probability range;

calculate a boosted possible payout amount based in part on the bet amount, the odds, and the multiplier; and transmit instructions to the client device to reveal the boosted possible payout amount and the multiplier via a slot machine graphic rendered on a display of the client device after the bet is placed, and wherein winning the bet associated with the sporting event results in a user of the client device winning the boosted possible payout amount.

12. The system of claim 11, wherein the slot machine graphic comprises a plurality of reels, wherein each of the reels comprises at least one symbol associated with the multiplier, and wherein the multiplier is revealed by graphically rotating all of the reels and successively stopping each of the reels on the symbol associated with the multiplier.

13. The system of claim 11, wherein the selection of multipliers comprises a 2× multiplier having a multiplier value of 2, a 3× multiplier having a multiplier value of 3, a 5× multiplier having a multiplier value of 5, a 10× multiplier having a multiplier value of 10, a 50× multiplier having a multiplier value of 50, or a 100× multiplier having a multiplier value of 100.

14. The system of claim 13, wherein the plurality of probability ranges are calculated by:

calculating a multiplier probability (probability$_{multiplier}$) associated with each of the multipliers from the selection of multipliers; and using a cumulative distribution function to establish boundary values for each of the probability ranges, wherein at least some of the boundary values are calculated using one or more multiplier probabilities, and wherein the plurality of probability ranges are non-overlapping numerical ranges.

15. The system of claim 14, wherein the multiplier probability (probability$_{multiplier}$) is calculated using the following expression:

$$probability_{multiplier} = \left(\frac{daily\ coefficient}{Multiplier\ value}\right) \times margin$$

wherein the margin is calculated based on the odds of the sporting event, and wherein the daily coefficient is a ratio calculated at least once per day.

16. A non-transitory computer-readable medium comprising machine-executable instructions stored thereon, that when executed by one or more processors, perform steps comprising:

receiving a request from a client device to place a bet on at least one sporting event having odds associated with the sporting event, wherein the request comprises a bet amount;

calculating a plurality of probability ranges, wherein each of the plurality of probability ranges is associated with a multiplier from a selection of multipliers or a non-multiplier;

generating a random number using a pseudo random number generator, wherein the random number is a number that falls within one of the plurality of probability ranges;

selecting the multiplier associated with a particular probability range when the random number generated by the pseudo random number generator falls within the particular probability range;

calculating a boosted possible payout amount based in part on the bet amount, the odds, and the multiplier; and transmitting instructions to the client device to reveal the boosted possible payout amount and the multiplier via a slot machine graphic rendered on a display of the client device after the bet is placed, and wherein winning the bet associated with the sporting event results in a user of the client device winning the boosted possible payout amount.

17. The non-transitory computer readable medium of claim 16, wherein the slot machine graphic comprises a plurality of reels, wherein each of the reels comprises at least one symbol associated with the multiplier, and wherein the multiplier is revealed by graphically rotating all of the reels and successively stopping each of the reels on the symbol associated with the multiplier.

18. The non-transitory computer readable medium of claim 16, wherein the selection of multipliers comprises a 2× multiplier having a multiplier value of 2, a 3× multiplier having a multiplier value of 3, a 5× multiplier having a multiplier value of 5, a 10× multiplier having a multiplier value of 10, a 50× multiplier having a multiplier value of 50, or a 100× multiplier having a multiplier value of 100.

19. The non-transitory computer readable medium of claim 18, wherein the plurality of probability ranges are calculated by:

calculating a multiplier probability (probability$_{multiplier}$) associated with each of the multipliers from the selection of multipliers; and using a cumulative distribution function to establish boundary values for each of the probability ranges, wherein at least some of the boundary values are calculated using one or more multiplier probabilities, and wherein the plurality of probability ranges are non-overlapping numerical ranges.

20. The non-transitory computer readable medium of claim 19, wherein the multiplier probability (probability$_{multiplier}$) is calculated using the following expression:

$$\text{probability}_{multiplier} = \left(\frac{\text{daily coefficient}}{\text{Multiplier value}}\right) \times \text{margin}$$

wherein the margin is calculated based on the odds of the sporting event, and wherein the daily coefficient is a ratio calculated at least once per day.

\* \* \* \* \*